July 12, 1932.  A. FEUCHT  1,867,072

ROCK DRILL

Filed Jan. 13, 1932

ALBERT FEUCHT
INVENTOR

BY John E. Renfer
ATTORNEY

Patented July 12, 1932

1,867,072

UNITED STATES PATENT OFFICE

ALBERT FEUCHT, OF CLEVELAND, OHIO, ASSIGNOR TO THE CLEVELAND ROCK DRILL COMPANY, OF CLEVELAND, OHIO, A CORPORATION OF OHIO

ROCK DRILL

Application filed January 13, 1932. Serial No. 586,275.

This invention relates broadly to rock drills but more particularly to valve mechanism for fluid actuated rock drill of the hammer type.

The objects of this invention are to produce a rock drill of the hammer type with a distributing and exhausting motive fluid controlling valve of simple and compact design affording a quick passage of the motive fluid to and from the cylinder for actuating the working piston, thus increasing the efficiency of the machine.

Other objects more or less ancillary to the foregoing will appear in the accompanying drawing, which sets forth the preferred embodiment of the invention.

Figure 1:
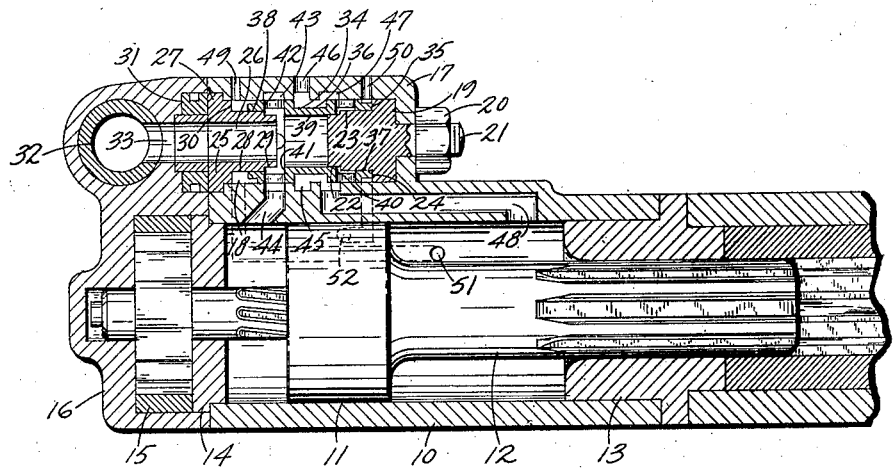
Fig. 1 is a longitudinal sectional view of a portion of a rock drill illustrating the valve in one extreme position.

The embodiment of the invention chosen for the purpose of illustration comprises a rock drill having a cylinder 10 within which there is reciprocably mounted a piston 11 formed with a stem 12 slidably engaged within a front bushing 13 constituting the forward termination of the cylinder, the rearward end being provided with an enclosure or bearing plate 14 which is clamped in position by a ratchet ring 15 secured within a back head 16 maintained to the cylinder 10 by a pair of side bolts (not shown). Adjacent the cylinder 10, there is a valve chest 17 formed with a valve chamber 18 capable to snugly receive a front bushing 19 being secured therein by the cooperation of a screw threaded nut 20 in screw tight engagement with an integral protruding stem 21. The bushing 19 is provided with two differential cylindrical portions 22 and 23, the latter forming with the enlarged portion engaged with the internal wall of the valve chamber a shoulder 24. Within the other end of the valve chamber 18, there is disposed in fluid tight engagement therein a rear bushing 25 having its penetration therein limited by an enlarged circular flange 27 in abutting relation with a corresponding counterbore provided in axial alignment with the valve chamber 18. The rear bushing 25 is formed with a bore 26 and is also provided with two differential cylindrical portions 28 and 29 similar to the portions 22 and 23 of the front bushing 19, the portion 28 forming with the enlarged portion engaged with the internal wall of the valve chamber a shoulder 30. The rear bushing 25 is maintained in its relative position within the valve chamber 18 by the engagement of a hollow compression gasget 31 preferably made of rubber disposed within the back head 16. Adjacent the packing 31, the back head is provided with a throttle valve 32 in registration with the valve chamber 18 through a passage 33.

Slidably mounted within the valve chamber 18 but in fluid tight engagement therein, there is a tubular valve 34 terminated by projecting lugs 35 and having intermediate thereof in equally spaced relation therefrom an external annular groove 36. Internally, the valve 34 is conveniently machined to form two similar bores 37 and 38 capable of slidable engagement upon the cylindrical portions 23 and 28 of the front and rear valve bushings 19 and 27 and intermediate thereof the valve 34 is provided with a smaller bore 39 capable of slidable engagement upon the restricted cylindrical portions 22 and 29 of the said bushings. Intermediate the bore 39 and the bores 37 and 38, the valve 34 is provided with two internal recesses forming at the intersection with the bore 39 two shoulders or annular surfaces 40 and 41, said recesses being in constant registration with the external wall of the valve 34 by a plurality of radially disposed orifices 42.

Internally disposed within the valve chamber 18, there is an annular groove 43 in constant registration with the rearward end of the cylinder 10 through a passageway 44 and an annular groove 45 in constant registration with the atmosphere through an exhaust port 46 and a groove 47 similar to the groove 43 in constant registration with the forward end of the cylinder 10 through a passageway 48. The ends of the valve chamber 18 are in constant registration with the atmosphere through two restricted passages 49 and 50 the purpose of which will be explained hereafter.

Intermediate its ends, the cylinder 10 is provided with a port 51 opening within the forward end thereof and leading within the valve chamber 18 adjacent the shoulder 30 of the rearward end valve bushing, and with a second crossed port 52 opening within the rearward end of the cylinder and leading within the valve chamber 18 adjacent the shoulder 24 of the forward valve bushing 19.

Figure 2:
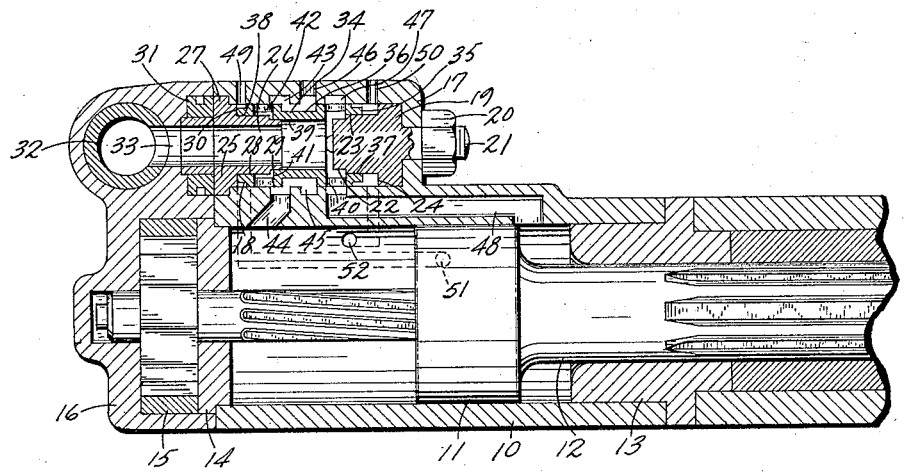
Fig. 2 is a view similar to Fig. 1 illustrating the valve in the other extreme position.
Figure 3:
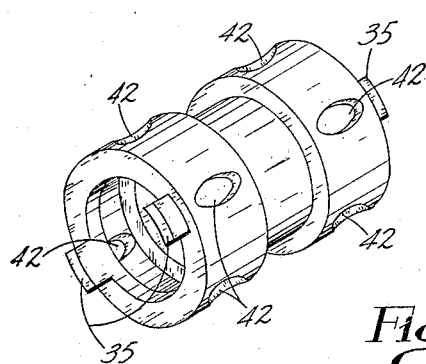
Fig. 3 is an enlarged detailed illustration in perspective of the valve.

In the operation of the mechanism assuming the various parts to be positioned as illustrated in Fig. 1, motive fluid will flow from the throttle valve 32 through the passage 33 and bore 26 into the valve bore 39 thus creating a pressure upon the annular face 41 to maintain the valve 34 in its forward position. From the valve bore 39 motive fluid will flow through the valve radially disposed orifices 42, annular groove 43 and passageway 44 into the rearward end of the cylinder 10 to act upon the piston 11 to move it forwardly for delivering its blow to the cutting tool. During this forward movement of the piston, it will be noticed that motive fluid is precluded to enter the forward end of the cylinder due to the fluid tight engagement of the valve 34 by its bore 39 upon the cylindrical portion 22 of the valve bushing 19. Motive fluid within the forward end of the cylinder 10 will exhaust to atmosphere through passageway 48, annular groove 47, valve external groove 36, internal groove 45, and exhaust port 46. During its forward displacement, the piston 11 will uncover the kick port 52 to admit motive fluid within the forward end of the valve chamber 18 to act upon the forward end of the valve 34 intermediate the lugs 35 to kick the valve rearwardly or in the position illustrated in Fig. 2. Subsequently motive fluid remaining upon the forward kicking area of the valve 34 will exhaust to atmosphere through the restricted passage 50 to allow the valve 34 to be again shifted to its former position.

The valve 34 will be maintained in its rearward position by the motive fluid exerting pressure upon the annular face 40. In that position, motive fluid will also flow past the radially disposed orifices 42, annular groove 47, and passageway 48 into the forward end of the cylinder 10 to act upon the piston 11 to move it rearwardly. Simultaneously motive fluid within the rearward end of the cylinder will exhaust to atmosphere through passageway 44, annular groove 43, valve external groove 36, valve chamber internal groove 45, and exhaust port 46. Subsequently the piston during its rearward movement will uncover the kick port 51 to admit motive fluid within the rearward end of the valve chamber 18 to act upon the rearward end of the valve 34 intermediate the lugs 35 to kick the valve forwardly or in the position illustrated in Fig. 1. After the forward displacement of the valve 34 has taken place, pressure fluid remaining upon the rearward end thereof will exhaust to atmosphere through the restricted passage 49 to prepare for the subsequent shifting of the valve to its rearward position.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope and spirit of the invention as herein claimed.

I claim:

1. A rock drill comprising a cylinder having a piston reciprocable therein, a valve chest formed with a valve chamber, a tubular valve reciprocable within said chamber, passages for constantly admitting motive fluid within said valve, other passages through said valve in constant registration with passageways opening into the forward and rearward end of said cylinder for intermittently admitting motive fluid therein for actuating said piston, actuating areas adjacent the outer end of said valve alternately subjected to motive fluid from said cylinder to actuate the valve and holding areas alternately subjected to the pressure of motive fluid for holding said valve in its extreme position.

2. A rock drill comprising a cylinder having a piston reciprocable therein, a valve chest formed with a valve chamber having a rear and front valve bushing stationary therein, a tubular valve reciprocable within said chamber and upon said bushings, passages through one of said bushings to constantly admit motive fluid within said valve, other passages through said valve in constant registration with passageways opening into said cylinder to admit motive fluid therein to actuate said piston, valve actuating areas subjected to motive fluid from said cylinder to actuate the valve, valve holding areas intermittently subjected to the pressure of motive fluid from said valve to hold the same in its respective position and means within said valve in cooperation with said bushings for controlling the admission of motive fluid into said cylinder.

3. A rock drill comprising a cylinder having a piston reciprocable therein, a valve chest formed with a valve chamber having a rear and front valve bushing stationary therein, a tubular valve reciprocable within said chamber, enlarged and restricted internal portions within said valve, said enlarged portions being in constant slidable engagement and said restricted portion in intermittent slidable engagement upon said bushings, passages through one of said bushings in registration with motive fluid source of supply to constantly admit motive fluid within said valve restricted portion, other passages through said valve in constant registration with passageways opening into the forward and rearward end of the cylinder to admit pressure fluid therein to actuate said piston, valve actuating areas subjected to motive fluid from said cylinder to actuate the valve, valve holding areas subjected to the pressure of motive fluid from said valve to hold the same in its extreme position and means whereby one end of said valve internal restricted portion is in engagement with one of said bushings for precluding the admission of motive fluid into one end of said cylinder while the other end of said last mentioned portion is out of engagement with the other of said bushings to allow the admission of motive fluid within said cylinder to actuate said piston.

4. A rock drill comprising a cylinder having a piston reciprocable therein, a valve chest formed with a valve chamber having a rear and front valve bushing stationary therein, a tubular valve reciprocable within said chamber, a plurality of enlarged and a unity of restricted internal portions within said valve, said enlarged portions being in constant slidable engagement and said restricted portion in intermittent slidable engagement upon said bushings, passages through one of said bushings in registration with the motive fluid source of supply to constantly admit motive fluid within said valve restricted portion, valve passages intermediate said enlarged and restricted portion in constant registration with passageways opening into the forward and rearward end of said cylinder to admit pressure fluid therein to actuate said piston, valve actuating areas subjected to motive fluid from said cylinder to actuate the valve, valve holding areas subject to the pressure of motive fluid from said valve to hold the same in its extreme position and means affording or preventing the registration of said valve passages with said valve restricted internal portion, said means comprising the engagement or disengagement of said last mentioned portion with said bushings.

5. A rock drill comprising a cylinder having a piston reciprocable therein, a valve chest formed with a valve chamber having a rear and front valve bushing stationary therein, a tubular valve reciprocable within said chamber, a plurality of enlarged and a unity of restricted internal portions within said valve, said enlarged portions being in constant slidable engagement and said restricted portion in intermittent slidable engagement upon said bushings, a passage through one of said bushings in registration with motive fluid source of supply to constantly admit motive fluid within said valve restricted portion, valve passages intermediate said enlarged and restricted portions in constant registration with passageways opening into the forward and rearward end of said cylinder to admit pressure fluid therein to actuate said piston, valve actuating areas subjected to motive fluid from said cylinder to actuate the valve, holding areas subjected to the pressure of motive fluid from said valve to hold the same in its extreme position, and means affording or preventing the registration of said valve passages with said valve restricted internal portion, said means comprising the engagement or disengagement of said last mentioned portion with said bushings and further means controlled by the external wall of said valve in cooperation with the internal wall of said valve chamber to control the exhaust of motive fluid from said cylinder to atmosphere.

6. A rock drill comprising a cylinder having a piston reciprocable therein, a valve chest formed with a valve chamber, a tubular valve slidable within said chamber, means for constantly admitting motive fluid within the intermediate portion of said valve, crossed ports leading from the cylinder to the actuating areas of said valve and controlled by said piston for admitting motive fluid upon said areas for actuating said valve, internal valve holding areas subjected to the pressure of motive fluid within said valve to hold the same at the extreme ends of its travel, passages through said valve in constant registration with passageways leading from said valve chamber to the forward and rearward end of said cylinder for admitting and exhausting motive fluid to and from said cylinder and means internally of said valve for controlling said admission and externally thereof for controlling said exhaust.

7. A rock drill comprising a cylinder having a piston reciprocable therein, a valve chest formed with a valve chamber, a tubular valve slidable within said chamber, means for constantly admitting motive fluid solely within the intermediate portion of said valve, valve passages transversely through the wall thereof, crossed ports leading from the cylinder to the actuating areas of said valve and controlled by said piston for admitting motive fluid upon said areas for actuating said valve, internal valve holding areas in constant registration with said valve passages and alternately subjected to the pressure of motive fluid within said valve to hold the same at the extreme ends of its travel, passageways in constant registration with said valve passages leading from said valve chamber to the forward and rearward end of said cylinder for admitting and exhausting motive fluid to and from said cylinder past said valve chamber, and means internally of said valve for controlling said admission and externally thereof for controlling said exhaust.

In testimony whereof I hereunto affix my signature this 9 day of January, 1932.

ALBERT FEUCHT.